United States Patent
Cao

(10) Patent No.: US 11,082,410 B2
(45) Date of Patent: Aug. 3, 2021

(54) DATA TRANSCEIVING OPERATIONS AND DEVICES

(71) Applicant: Advanced New Technologies Co., Ltd., Grand Cayman (KY)

(72) Inventor: Lin Cao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/818,887

(22) Filed: Mar. 13, 2020

(65) Prior Publication Data

US 2020/0344215 A1 Oct. 29, 2020

Related U.S. Application Data

(63) Continuation of application No. PCT/CN2020/071873, filed on Jan. 14, 2020.

(30) Foreign Application Priority Data

Apr. 26, 2019 (CN) .......................... 201910343697.5

(51) Int. Cl.
*H04W 12/00* (2021.01)
*G06F 21/00* (2013.01)
(Continued)

(52) U.S. Cl.
CPC .......... *H04L 63/0428* (2013.01); *G06F 21/00* (2013.01); *H04L 63/0478* (2013.01);
(Continued)

(58) Field of Classification Search
CPC ............. H04L 63/0428; H04L 63/0478; H04L 63/164; H04L 63/166; H04L 69/161;
(Continued)

(56) References Cited

U.S. PATENT DOCUMENTS

2004/0059926 A1 3/2004 Angelo et al.
2005/0251856 A1 11/2005 Araujo et al.
(Continued)

FOREIGN PATENT DOCUMENTS

CN 101621509 1/2010
CN 102664896 9/2012
(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
(Continued)

*Primary Examiner* — Jung W Kim
*Assistant Examiner* — Howard H. Louie
(74) *Attorney, Agent, or Firm* — Fish & Richardson P.C.

(57) ABSTRACT

Implementations of this specification provide data transceiving operations and devices. An example method performed by a network interface controller (NIC) includes receiving to-be-sent data from a host; sending the to-be-sent data to a first data processing module that is outside of the NIC; receiving first processing result data from the first data processing module; using a network interface of the NIC to send the first processing result data to a data receiver; receiving to-be-received data from a data sender; sending the to-be-received data to a second data processing module that is outside of the NIC; receiving second processing result data from the second data processing module; and using a host interface of the NIC to send the second processing result data to the host.

5 Claims, 11 Drawing Sheets

(51) Int. Cl.
  *H04W 12/10* (2021.01)
  *H04L 29/06* (2006.01)
  *H04W 12/03* (2021.01)

(52) U.S. Cl.
  CPC .......... *H04L 63/164* (2013.01); *H04L 63/166* (2013.01); *H04L 69/161* (2013.01); *H04W 12/00* (2013.01); *H04W 12/03* (2021.01); *H04W 12/10* (2013.01)

(58) Field of Classification Search
  CPC ..... H04W 12/00; H04W 12/10; H04W 12/03; G06F 21/00
  See application file for complete search history.

(56) References Cited

U.S. PATENT DOCUMENTS

| | | | |
|---|---|---|---|
| 2007/0154018 A1* | 7/2007 | Watanabe | H04L 63/164 380/273 |
| 2016/0330112 A1 | 11/2016 | Raindel et al. | |

FOREIGN PATENT DOCUMENTS

| | | |
|---|---|---|
| CN | 102884515 | 1/2013 |
| CN | 102904729 | 1/2013 |
| CN | 106156851 | 11/2016 |
| CN | 106815157 | 6/2017 |
| CN | 107426193 | 12/2017 |
| CN | 107690622 | 2/2018 |
| CN | 109450960 | 3/2019 |
| CN | 109558373 | 4/2019 |
| CN | 109656855 | 4/2019 |
| CN | 109714292 | 5/2019 |
| CN | 110177083 | 8/2019 |
| TW | I449388 | 8/2014 |
| TW | I505185 | 10/2015 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071873, dated Apr. 8, 2020, 19 pages (with machine translation).

* cited by examiner

DATA TRANSCEIVING OPERATIONS AND DEVICES

CROSS-REFERENCE TO RELATED APPLICATIONS

This application is a continuation of PCT Application No. PCT/CN2020/071873, filed on Jan. 14, 2020, which claims priority to Chinese Patent Application No. 201910343697.5, filed on Apr. 26, 2019, and each application is hereby incorporated by reference in its entirety.

TECHNICAL FIELD

The present specification relates to the field of computer technologies, and in particular, to network interface controllers (NICs), data transceiving methods, and devices.

BACKGROUND

In the field of electronic communications, to improve data transmission efficiency and security of a communications network, a relatively common technical solution is to compress and encrypt data transmitted on the communications network. An implementation of the previous technical solution requires that a communication data sender and receiver have corresponding compression/encryption and decompression/decryption capabilities. Because both a compression/encryption operation and a decompression/decryption operation consume significant data processing resources, the previous technical methods greatly increases data processing pressure on host CPUs of the communication data sender and receiver.

In the existing technology, to reduce data processing pressure on host CPUs of communication data sender and receiver while ensuring data transmission efficiency and security of a communications network, one of the current technical methods is to access an independent compression/encryption device and an independent decompression/decryption device for a host, for example, an accelerator card that is specially used for compression/decompression and encryption/decryption. When the host performs a compression/encryption or decompression/decryption operation, the host sends to-be-processed data to a corresponding accelerator card, and directly obtains result data generated through compression/encryption and decompression/decryption, thereby alleviating consuming processing resources of the host CPU during the compression/encryption operation and the decompression/decryption operation.

In an application scenario of the previous operation, consumption of data processing resources of the host CPU that are originally used for compression/encryption and decompression/decryption operations is transferred to the accelerator card. However, correspondingly, the host CPU additionally consumes communication resources to exchange data with the accelerator card. This offsets a part of acceleration benefits of the accelerator card. Particularly, when a ratio of a single communication data transmission length to a communication data transmission frequency is less than a specific threshold, consumption of communication resources used for data exchange between the host CPU and the accelerator card is even greater than consumption of data processing resources transferred to the accelerator card. This makes setting of the accelerator card meaningless.

SUMMARY

In view of this, implementations of the present specification provide network interface controllers (NICs), data transceiving methods, and devices, so as to alleviate a problem of resource occupation on a host CPU in communication data compression/decompression and/or encryption/decryption processes in the existing technology.

The following technical solutions are used in the implementations of the present specification.

An implementation of the present specification provides a network interface controller (NIC), including: a host interface, configured to connect to a host and receive to-be-sent data from the host; a data sending module, connected to the host interface and a first data processing module outside the NIC, and configured to send the to-be-sent data to the first data processing module, and receive first processing result data from the first data processing module, wherein the first processing result data is generated by the first data processing module by compressing and/or encrypting the to-be-sent data; and a network interface, configured to connect to a data receiver, and send the first processing result data to the data receiver.

In an implementation of the present specification, the data sending module includes: a communication data processing unit, connected to the first data processing module, and configured to receive and forward the to-be-sent data and the first processing result data; and a protocol stack, connected to the communication data processing unit, the host interface, and the network interface, and configured to establish respective communicative connections to the host and the data receiver by using the host interface or the network interface, and perform respective data forwarding between the communication data processing unit, the host interface and the network interface after the respective communicative connections are established.

In an implementation of the present specification, the communication data processing unit includes: an external proxy unit, configured to receive the to-be-sent data from the host interface by using the protocol stack, send the to-be-sent data to the first data processing module, receive the first processing result data from the first data processing module, and output the first processing result data; and a host proxy unit, configured to receive the first processing result data from the external proxy unit, and send the first processing result data to the network interface by using the protocol stack.

An implementation of the present specification further provides an NIC, and the NIC includes a host interface, a data sending module, a network interface, and a first data processing module that are described in the implementation of the present specification.

An implementation of the present specification further provides an NIC, including: a network interface, configured to connect to a data sender and receive to-be-received data from the data sender; a data receiving module, connected to a second data processing module outside the NIC, and configured to send the to-be-received data to the second data processing module, and receive second processing result data from the second data processing module, wherein the second processing result data is generated by the second data processing module by decompressing and/or decrypting the to-be-received data; and a host interface, configured to connect to a host and send the second processing result data to the host.

In an implementation of the present specification, the data receiving module includes: a communication data processing unit, connected to the second data processing module, and configured to receive and forward the to-be-received data and the second processing result data; and a protocol stack, connected to the communication data processing unit, the host interface, and the network interface, and configured to establish respective communicative connections the host and the data sender by using the host interface or the network interface, and perform data forwarding between the communication data processing unit, the host interface and the network interface after the respective communicative connections are established.

In an implementation of the present specification, the communication data processing unit includes: a host proxy unit, configured to receive the to-be-received data from the network interface by using the protocol stack, send the to-be-received data to the second data processing module, receive the second processing result data from the second data processing module, and output the second processing result data; and an external proxy unit, configured to receive the second processing result data from the host proxy unit, and send the second processing result data to the host interface by using the protocol stack.

An implementation of the present specification further provides an NIC, and the NIC includes a host interface, a data receiving module, a network interface, and a second data processing module that are described in the implementation of the present specification.

An implementation of the present specification further provides a data sending method, including: receiving to-be-sent data from a host; sending the to-be-sent data to a first data processing module; receiving first processing result data from the first data processing module, wherein the first processing result data is generated by the first data processing module by compressing and/or encrypting the to-be-sent data; and sending the first processing result data to a data receiver.

An implementation of the present specification further provides a data receiving method, including: receiving to-be-received data from a data sender; sending the to-be-received data to a second data processing module; receiving second processing result data from the second data processing module, wherein the second processing result data is generated by the second data processing module by decompressing and/or decrypting the to-be-received data; and sending the second processing result data to a host.

The present application further provides a device for processing information at user equipment, wherein the device comprises a memory configured to store computer program instructions and a processor configured to execute the program instructions, and when the computer program instructions are executed by the processor, the device is triggered to perform the method in the implementation of the present specification.

At least one of the previous technical solutions used in the implementations of the present specification can achieve the following beneficial effects: Based on the technical solutions of the implementations of the present specification, in a communication process, the host CPU does not need to perform communication data compression/decompression and encryption/decryption operations, and does not need to exchange data with hardware modules used to perform communication data compression/decompression and/or encryption/decryption operations. As such, resources of the host CPU used to perform the communication data compression/decompression and encryption/decryption operations are released, system overheads are reduced, and a system data throughput is finally improved.

BRIEF DESCRIPTION OF DRAWINGS

The accompanying drawings described here are intended to provide a further understanding of the present application, and constitute a part of the present application. The explanation implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present specification without creative efforts shall fall within the protection scope of the present application.

In the existing technology, to reduce data processing pressure on host CPUs of communication data sender and receiver while ensuring data transmission efficiency and security of a communications network, one of the current technical methods is to access an independent compression/encryption device and an independent decompression/decryption device for a host, for example, an accelerator card that is specially used for compression/decompression and encryption/decryption. When the host needs to perform a compression/encryption or decompression/decryption operation, the host sends to-be-processed data to a corresponding accelerator card, and directly obtains result data generated through compression/encryption and decompression/decryption, thereby alleviating consuming processing resources of the host CPU during the compression/encryption operation and the decompression/decryption operation.

Figure 1:
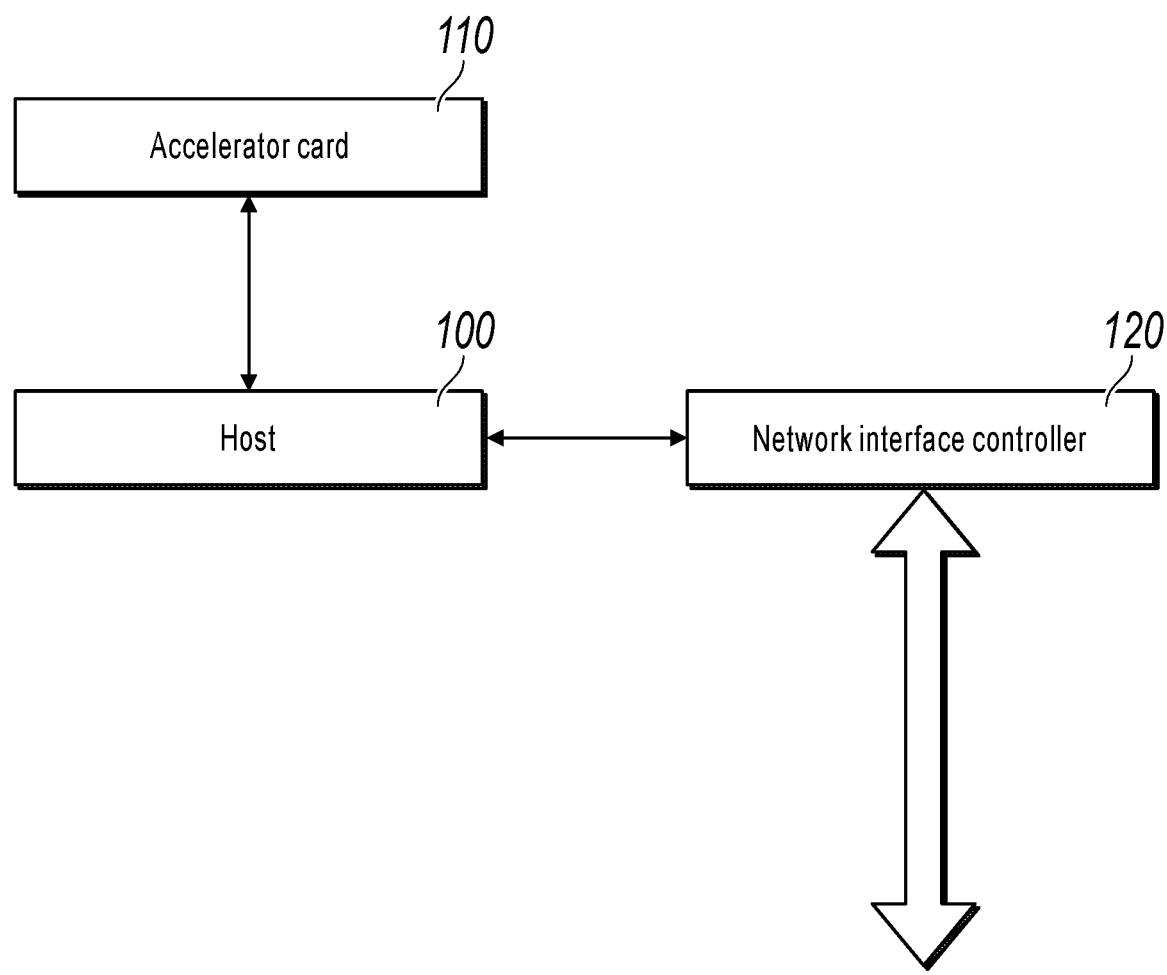
FIG. 1 is a schematic structural diagram illustrating a communications system in the existing technology.

As shown in FIG. 1, in an application scenario, a host 100 is connected to an accelerator card 110 and a network interface controller (NIC) 120. The NIC 120 accesses an external communications network. When the host 100 needs to send data by using the external communications network, the host 100 first sends to-be-sent data to the accelerator card 110. Then, the accelerator card 110 performs compression and/or encryption processing on the to-be-sent data, and feeds back a processing result (first processing result data) to the host 100. After receiving the first processing result data fed back by the accelerator card 110, the host 100 sends the first processing result data to the external communications network by using the NIC 120. Similarly, when the host 100 receives, by using the NIC 120, to-be-received data transmitted by the external communications network, the host 100 first sends the to-be-received data to the accelerator card 110. The accelerator card 110 performs decompression and/or decryption processing on the to-be-received data, and feeds back a processing result (second processing result data) to the host 100. After receiving the second processing result data fed back by the accelerator card 110, the host 100 performs a next data processing operation to complete data receiving.

In the application scenario of the previous operation, consumption of data processing resources of a CPU of the host 100 that are originally used for compression/encryption and decompression/decryption operations is transferred to the accelerator card 110. However, correspondingly, the CPU of the host 100 needs to additionally consume communication resources to exchange data with the accelerator card 110. This offsets a part of acceleration benefits of the accelerator card. Particularly, when a ratio of a single communication data transmission length to a communication data transmission frequency is less than a specific threshold, consumption of communication resources used for data exchange between the host CPU and the accelerator card is even greater than consumption of data processing resources transferred to the accelerator card. This makes setting of the accelerator card meaningless.

To alleviate the previous problem, the implementations of the present specification provide a new communication hardware architecture. In the communication hardware architecture, a host CPU does not need to access hardware modules used for compression/encryption and/or decompression/decryption operations, but directly accesses a hardware module (such as an NIC) used for network communication, and access to the hardware modules used for the compression/encryption and/or decompression/decryption operations is completed by the hardware module used for network communication. This is equivalent to transferring consumption of communication resources used for exchanging data with an accelerator card to the hardware module used for network communication. This greatly reduces host system overheads, thereby improving a system data throughput.

Based on the technical solutions of the implementations of the present specification, in a communication process, the host CPU does not need to perform communication data compression/decompression and encryption/decryption operations, and does not need to exchange data with hardware modules used to perform communication data compression/decompression and/or encryption/decryption operations. As such, resources of the host CPU used to perform the communication data compression/decompression and encryption/decryption operations are released, system overheads are reduced, and a system data throughput is finally improved.

The technical solutions provided in the implementations of the present specification are described in detail below with reference to the accompanying drawings.

Figure 2:
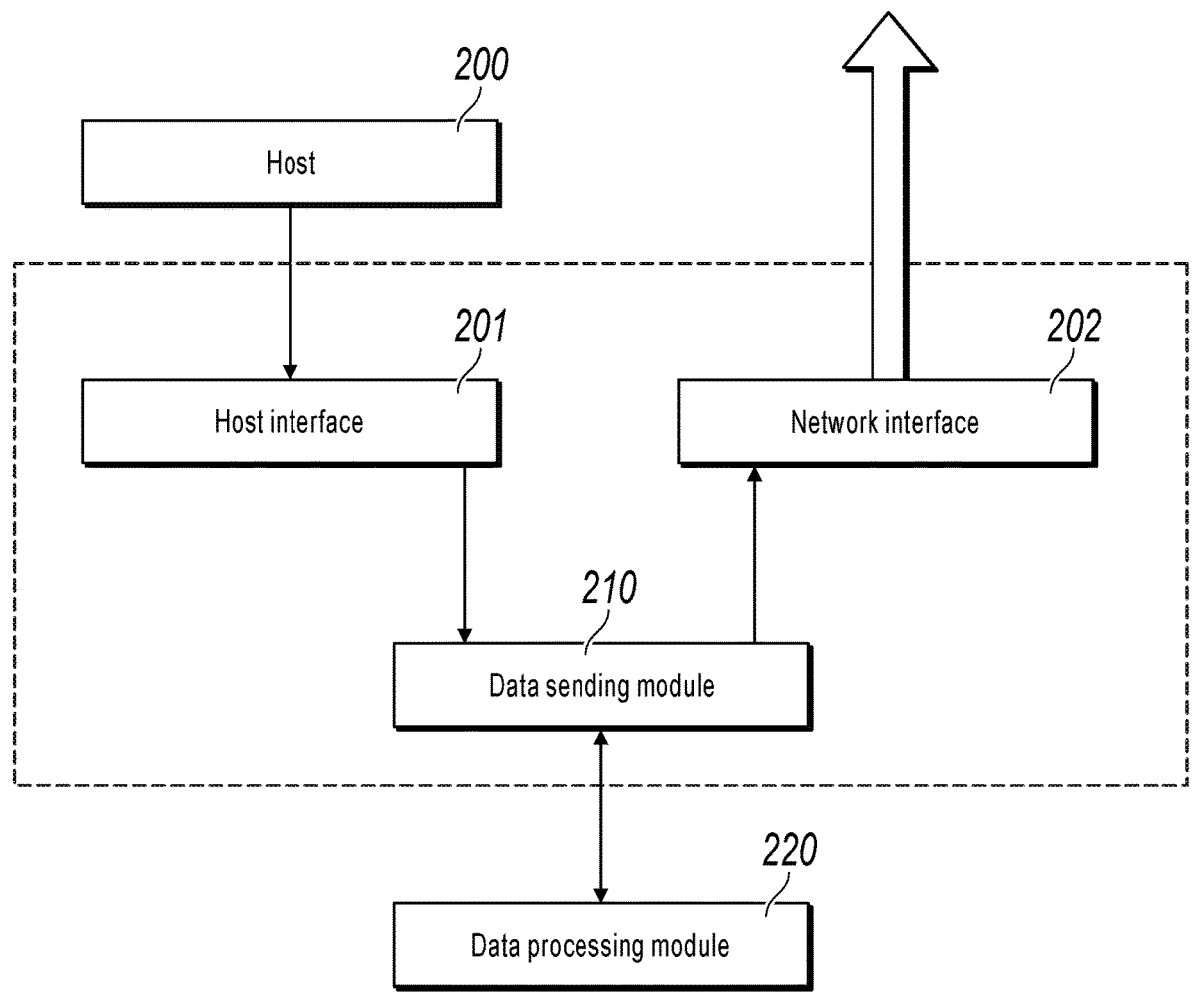
FIG. 2 to FIG. 10 are schematic structural diagrams illustrating network interface controllers (NICs), according to implementations of the present specification.

Specifically, in an implementation of the present specification, an NIC is provided. Specifically, as shown in FIG. 2, in an implementation, the NIC includes: a host interface 201, configured to connect to a host 200 and receive to-be-sent data from the host 200; a data sending module 210, connected to a data processing module 220 outside the NIC, and configured to obtain the to-be-sent data from the host 200 by using the host interface 201; send the to-be-sent data to the data processing module 220; and receive processing result data from the data processing module 220, where processing result data is generated by the data processing module 220 by compressing and/or encrypting the to-be-sent data; and a network interface 202, configured to connect to a data receiver, and send, to the data receiver, the processing result data forwarded by the data sending module 210.

Specifically, in an implementation of the present specification, in actual application scenarios, the network interface 202 can be directly connected to the data receiver, or can be connected to a communications network and connected to the data receiver through the communications network.

Figure 3:
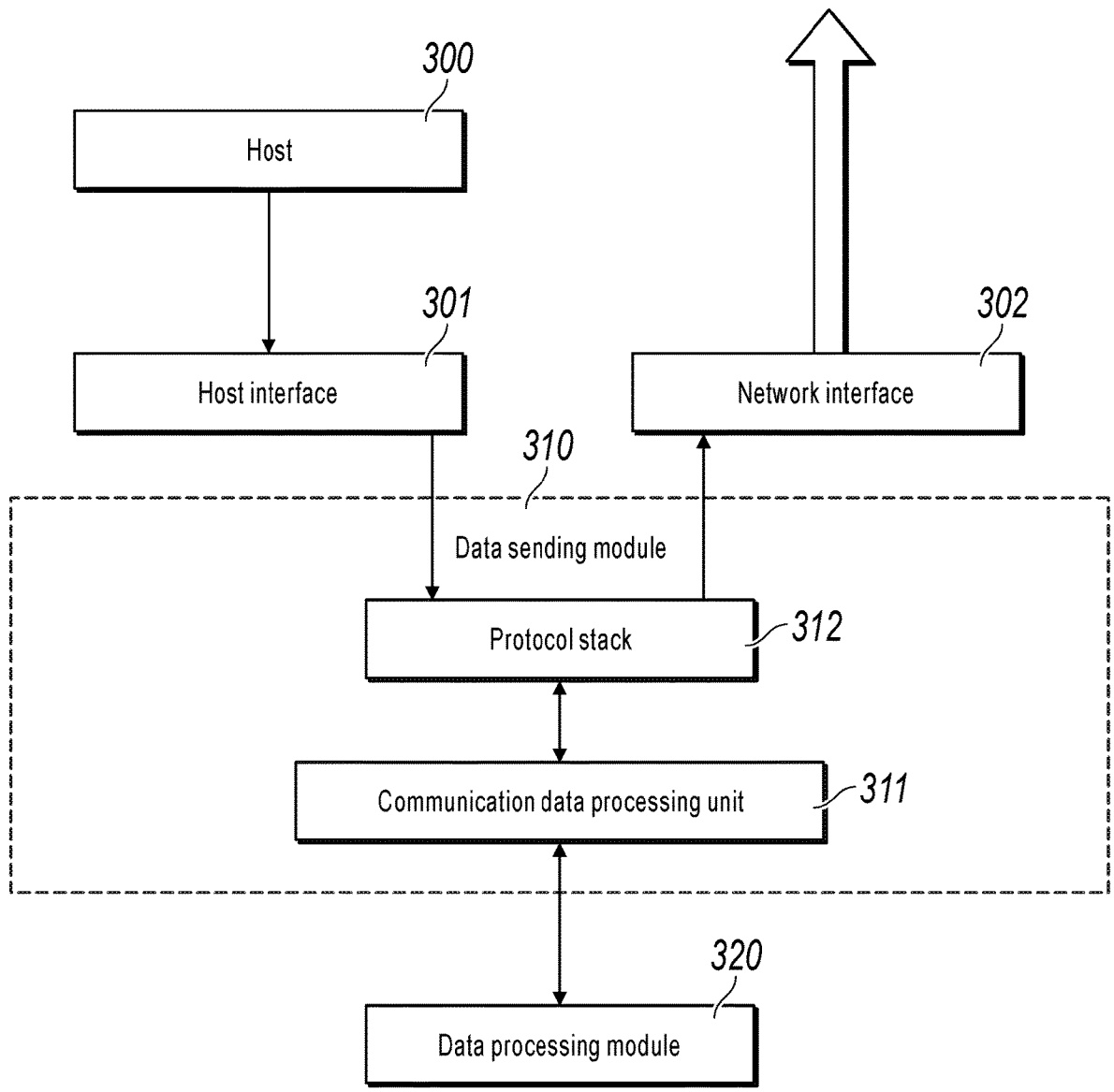

Further, in an implementation of the present specification, as shown in FIG. 3, a data sending module 310 includes: a communication data processing unit 311, connected to a data processing module 310, and configured to receive and forward to-be-sent data from a host 300 and processing result data generated by the data processing module 320; and a protocol stack 312, connected to the communication data processing unit 311, a host interface 301, and a network interface 302, and configured to establish respective communicative connections between the communication data processing unit 311, the host 300 and the data receiver by using the host interface 301 or the network interface 302, and perform data forwarding between the communication data processing unit 311, the host interface 301 and the network interface 302 after the respective communicative connections are established.

Further, in an implementation of the present specification, the protocol stack of the data sending module is a TCP/IP protocol stack.

Specifically, in an implementation of the present specification, in an application scenario, the protocol stack 312 first establishes respective communicative connections between the communication data processing unit 311, the host 300 and the data receiver by using the host interface 301 or the network interface 302. The host 300 sends the to-be-sent data to the protocol stack 312 by using the host interface 301. The protocol stack 312 sends the to-be-sent data to the communication data processing unit 311. The communication data processing unit 311 sends the to-be-sent data to the data processing module 320. After compressing and/or encrypting the to-be-sent data, the data processing module 320 returns generated processing result data to the communication data processing unit 311. The communication data processing unit 311 sends the processing result data to the protocol stack 312. The protocol stack 312 sends the processing result data to the data receiver by using the network interface 302.

Figure 4:
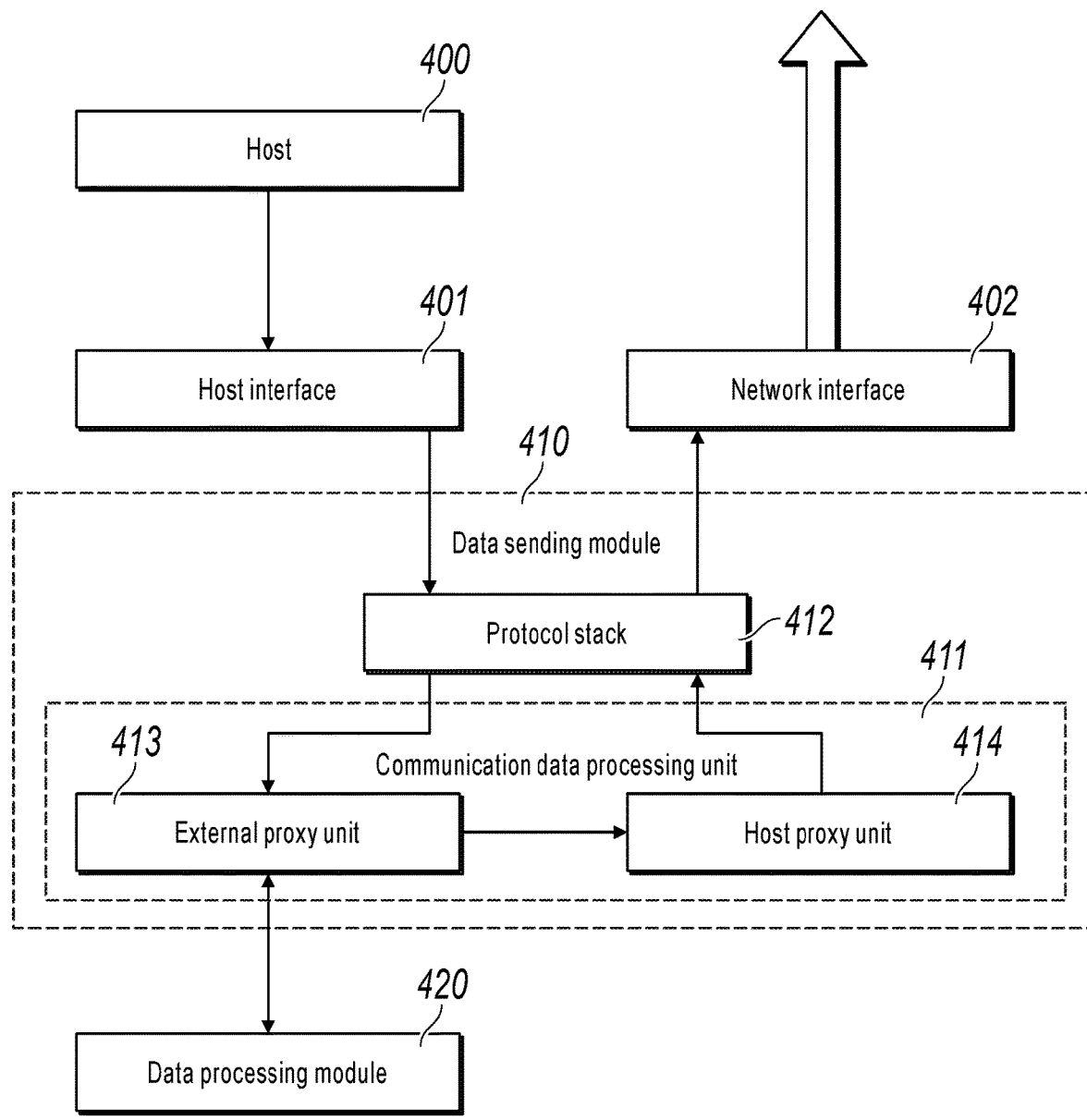

Further, in an implementation of the present specification, as shown in FIG. 4, a communication data processing unit 411 includes: an external proxy unit 413, configured to receive to-be-sent data from a host interface 401 by using a protocol stack 412, send the to-be-sent data to a data processing module 420, receive processing result data from the data processing module 420, and output the processing result data; and a host proxy unit 414, configured to receive the processing result data from the external proxy unit 413, and send the processing result data to a network interface 402 by using the protocol stack 412.

Specifically, in an implementation of the present specification, in an application scenario, the protocol stack 412 first establishes respective communicative connections between the external proxy unit 413 and the host 400 and respective communicative connections between the host proxy unit 414 and the data receiver by using the host interface 401 or the network interface 402. The host 400 sends the to-be-sent data to the protocol stack 412 by using the host interface 401. The protocol stack 412 sends the to-be-sent data to the external proxy unit 413. The external proxy unit 413 sends the to-be-sent data to the data processing module 420. After compressing and/or encrypting the to-be-sent data, the data processing module 420 returns generated processing result data to the external proxy unit 413. The external proxy unit 413 sends the processing result data to the host proxy unit 414. The host proxy unit 414 sends the processing result data to the protocol stack 412. The protocol stack 412 sends the processing result data to the data receiver by using the network interface 402.

Further, in an implementation of the present specification, an NIC is further provided. Specifically, the NIC includes the following components provided in the implementations of the present specification: the host interface, the data sending module, the network interface, and the data processing module that is connected to the data sending module and that is configured to compress and/or encrypt to-be-sent data.

Further, in an implementation of the present specification, a network interface controller (e.g., a smart NIC) that has a flexible programmable capability is used to implement the NIC provided in the implementations of the present specification, and a processing module based on the network interface card is used to construct a data processing module configured to compress and/or encrypt to-be-sent data. As such, through internal data communication of the network interface card, data can be exchanged between a data sending module and the data processing module configured to compress and/or encrypt the to-be-sent data, thereby greatly improving data throughput efficiency of a data sending system.

Specifically, in an implementation of the present specification, a compression and/or encryption algorithm is determined based on a compression and/or encryption requirement of data sending. Data transmission logic of the data sending module in the implementations of the present specification can be compiled by invoking program code of the compression and/or encryption algorithm. Compiled program code and compression and/or encryption algorithm are written into a programmable chip of the smart NIC. As such, the smart NIC can run the written program code to receive the to-be-sent data, and compress and/or encrypt the to-be-sent data by invoking the written compression and/or encryption algorithm, to generate processing result data, and output the processing result data.

Figure 5:
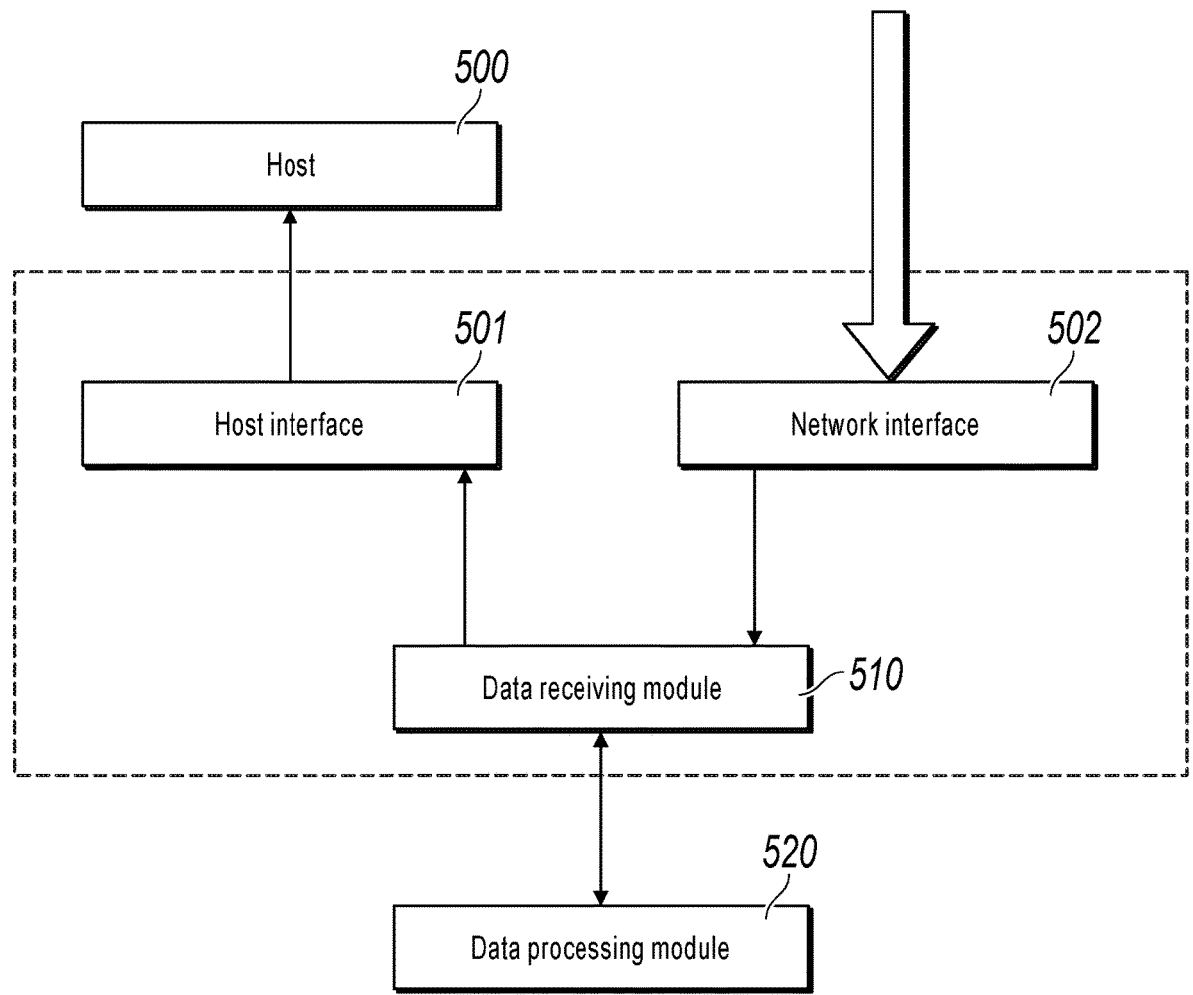

Further, in an implementation of the present specification, an NIC is further provided. Specifically, as shown in FIG. 5, in an implementation, the NIC includes: a network interface 502, configured to connect to a data sender and receive to-be-received data from a data sender; a data receiving module 510, connected to a data processing module 520 outside the NIC, configured to obtain the to-be-received data from the data sender by using the network interface 502; send the to-be-received data to the data processing module 520; and receive processing result data from the data processing module 520, where the processing result data is generated by the data processing module 520 by decompressing and/or decrypting the to-be-received data; and a host interface 501, configured to connect to a host and send, to the host 500, the processing result data forwarded by the data receiving module 510.

Specifically, in an implementation of the present specification, in actual application scenarios, the network interface 502 can be directly connected to the data sender, or can be connected to a communications network and connected to the data sender through the communications network.

Figure 6:
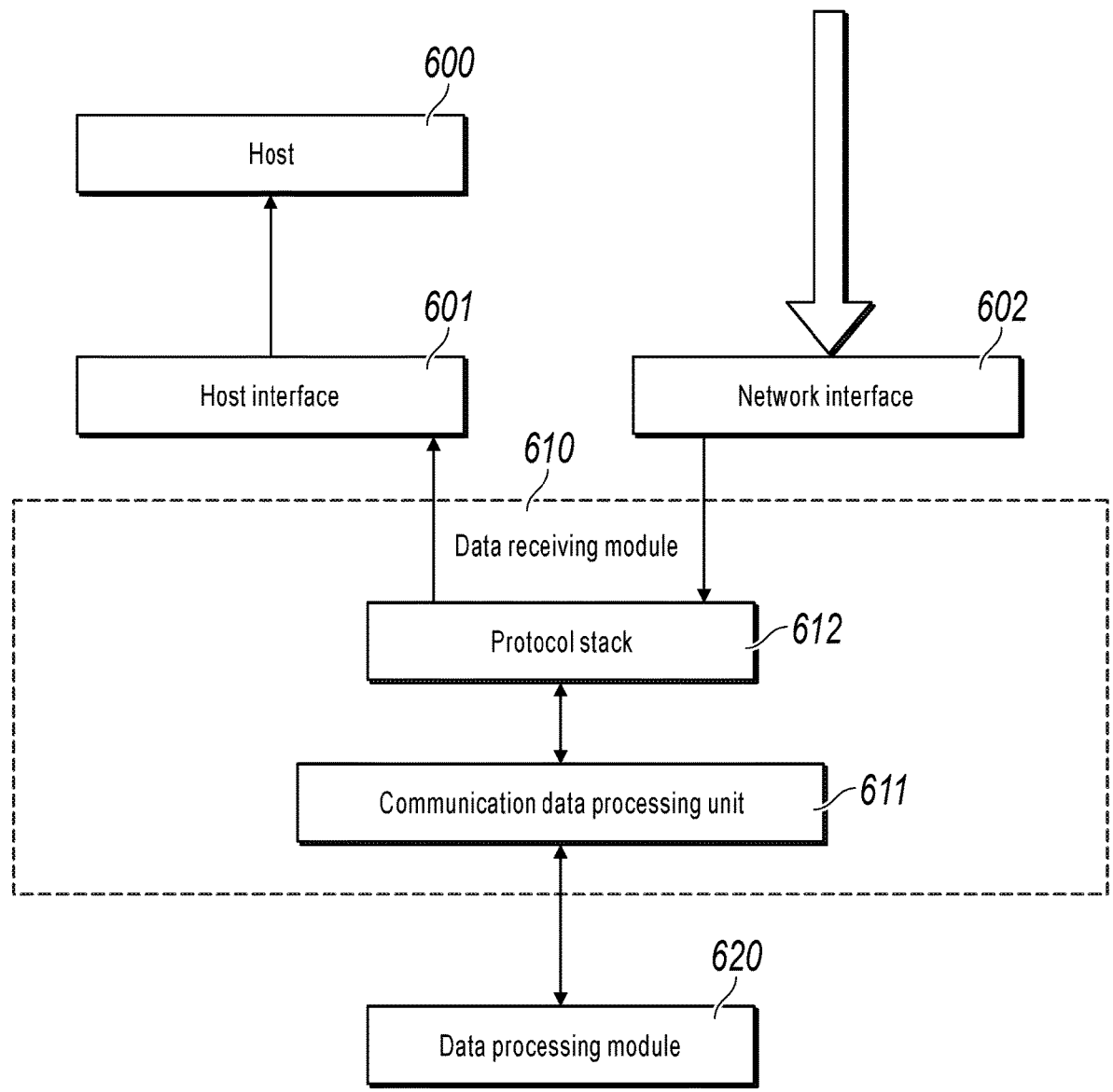

Further, in an implementation of the present specification, as shown in FIG. 6, a data receiving module 610 includes: a communication data processing unit 611, connected to a data processing module 620, and configured to receive and forward to-be-received data from the data sender and processing result data generated by the data processing module 620; and a protocol stack 612, connected to the communication data processing unit 611, a host interface 601, and a network interface 602, and configured to establish respective communicative connections to a host 600 and the data sender by using the host interface 601 or the network interface 602, and perform data forwarding between the communication data processing unit 611, the host interface 601 and the network interface 602 after the respective communicative connections are established.

Further, in an implementation of the present specification, the protocol stack of the data receiving module is a TCP/IP protocol stack.

Specifically, in an implementation of the present specification, in an application scenario, the protocol stack 612 first establishes respective communicative connections between the communication data processing unit 611 and the host 600 and the data sender by using the host interface 601 or the network interface 602. The data sender sends the to-be-received data to the protocol stack 612 by using the network interface 602. The protocol stack 612 sends the to-be-received data to the communication data processing unit 611. The communication data processing unit 611 sends the to-be-received data to the data processing module 620. After decompressing and/or decrypting the to-be-received data, the data processing module 620 returns generated processing result data to the communication data processing unit 611. The communication data processing unit 611 sends the processing result data to the protocol stack 612. The protocol stack 612 sends the processing result data to the host 600 by using the host interface 601.

Figure 7:
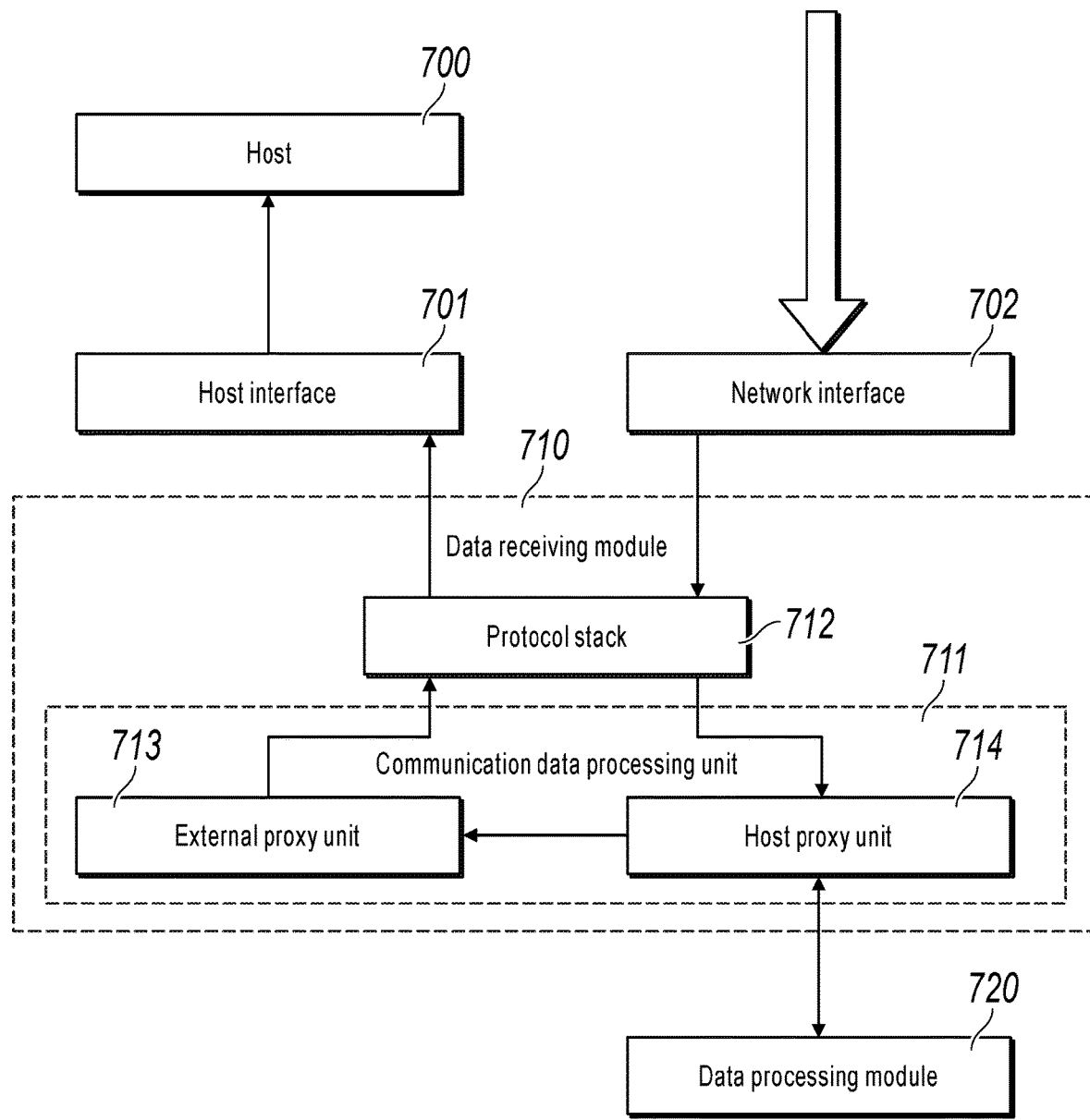

Further, in an implementation of the present specification, as shown in FIG. 7, a communication data processing unit 711 includes: a host proxy unit 714, configured to receive the to-be-received data from a network interface 702 by using a protocol stack 712, send the to-be-received data from the network interface 702 to a data processing module 720, receive processing result data from the data processing module 720, and output the processing result data; and an external proxy unit 713, configured to receive the processing result data from the host proxy unit 714, and send the processing result data to a host interface 701 by using the protocol stack 712.

Specifically, in an implementation of the present specification, in an application scenario, the protocol stack 712 first establishes respective communicative connections between the external proxy unit 713 and the host 700 and respective communicative connections between the host proxy unit 714 and the data sender by using the host interface 701 or the network interface 702. The data sender sends the to-be-received data to the protocol stack 712 by using the network interface 702. The protocol stack 712 sends the to-be-received data to the host proxy unit 714. The host proxy unit 714 sends the to-be-received data to the data processing module 720. After decompressing and/or decrypting the to-be-received data, the data processing module 720 returns generated processing result data to the host proxy unit 714. The host proxy unit 714 sends the processing result data to the external proxy unit 713. The external proxy unit 713 sends the processing result data to the protocol stack 712. The protocol stack 712 sends the processing result data to the host 700 by using the host interface 701.

Further, in an implementation of the present specification, an NIC is further provided. Specifically, the NIC includes the following components provided in the implementations of the present specification: the host interface, the data receiving module, the network interface, and the data processing module that is connected to the data receiving module and that is configured to decompress and/or decrypt to-be-received data.

Specifically, in an implementation of the present specification, a network interface card (a smart NIC) that has a flexible programmable capability is used to implement the NIC provided in the implementations of the present specification, and a processing module based on the network interface card is used to construct the data processing module configured to decompress and/or decrypt the to-be-received data. As such, through internal data communication of the network interface card, data can be exchanged between the data receiving module and the data processing module configured to decompress and/or decrypt the to-be-received data, thereby greatly improving data throughput efficiency of a data receiving system.

Specifically, in an implementation of the present specification, a decompression and/or decryption algorithm is determined based on a decompression and/or decryption requirement of data receiving. Data transmission logic of the data receiving module in the implementations of the present specification can be compiled by invoking program code of the decompression and/or decryption algorithm. Compiled program code and decompression and/or decryption algorithm are written into a programmable chip of the smart NIC. As such, the smart NIC can run the written program code to receive the to-be-received data, and decompress and/or decrypt the to-be-received data by invoking the written decompression and/or decryption algorithm, to generate processing result data, and output the processing result data.

Figure 8:
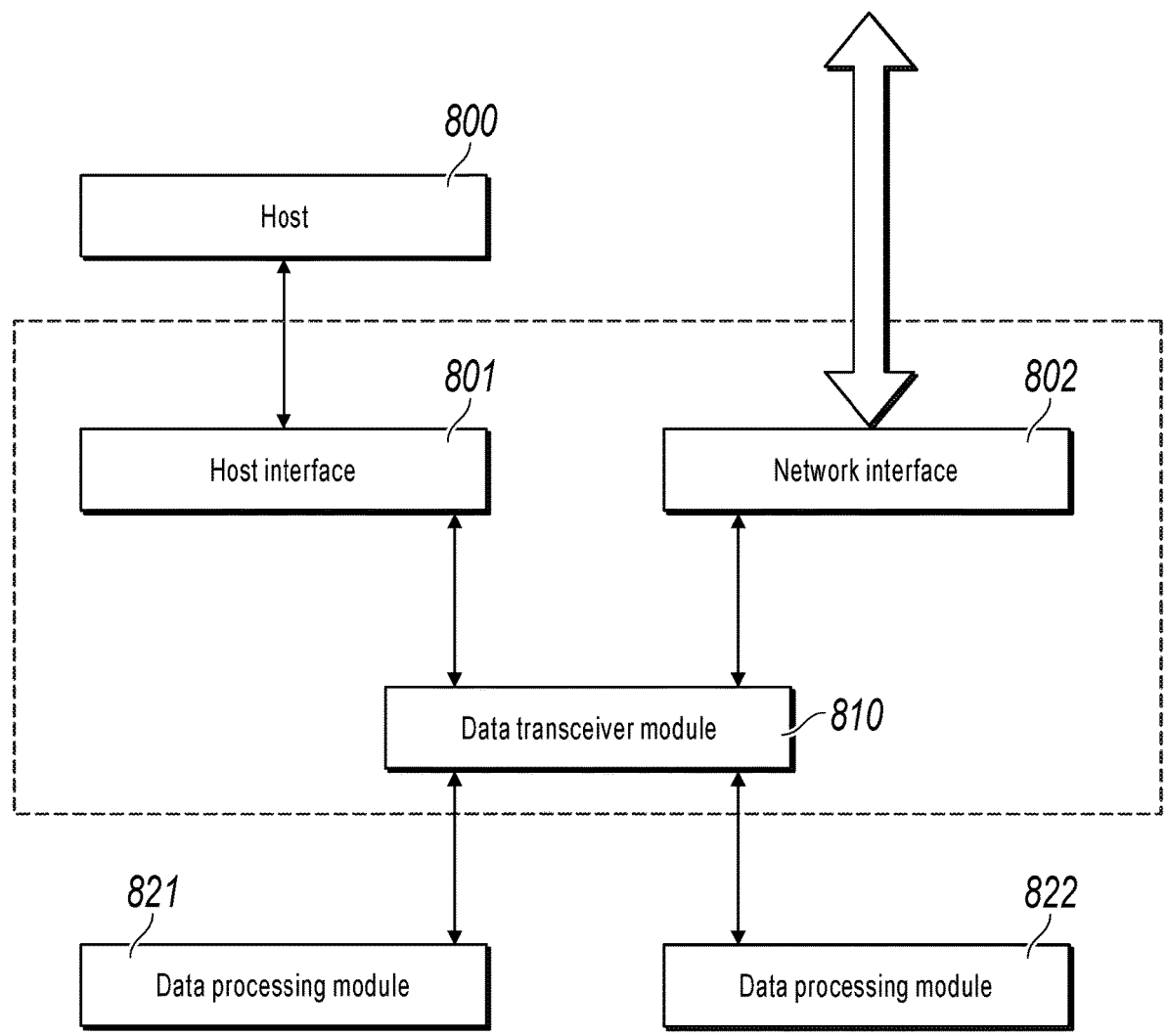

Further, in an implementation of the present specification, an NIC is further provided. Specifically, as shown in FIG. 8, in an implementation, the NIC includes: a host interface 801, configured to connect to a host and a network interface 802 configured to connect to a data receiver; and a data transceiver module 810, connected to a data processing module 821 and a data processing module 822 that are outside the NIC, and having functions of the data receiving module and the data sending module in the implementations of the present specification, where the data transceiver module 810 is specifically configured to: receive to-be-received data from a data sender by using the network interface 802; send the to-be-received data from the data sender to the data processing module 821; receive first processing result data from the data processing module 821, where the first processing result data is generated by the data processing module 821 by decompressing and/or decrypting the to-be-received data; send the first processing result data to the host 800 by using the host interface 801; receive to-be-sent data from the host 800 by using the host interface 801; send the to-be-sent data from the host 800 to the data processing module 822; receive second processing result data from the data processing module 822, where the second processing result data is generated by the data processing module 822 by compressing and/or encrypting the to-be-sent data; and send the second processing result data to the data receiver by using the network interface 802.

Specifically, in an implementation of the present specification, in actual application scenarios, the network interface can be directly connected to the data sender and/or the data receiver, or can be connected to a communications network and connected to the data sender and/or the data receiver through the communications network.

Figure 9:
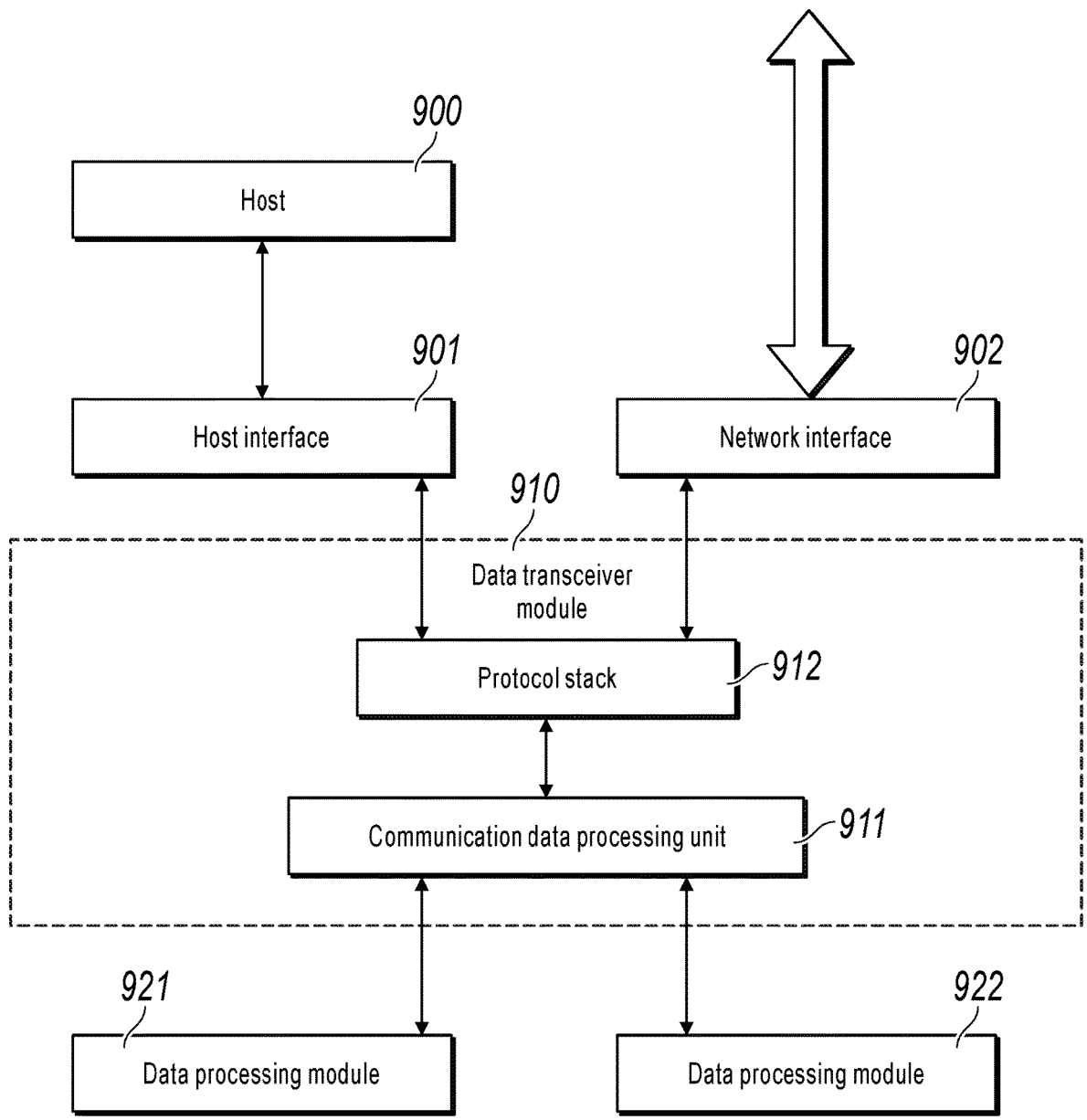

Further, in an implementation of the present specification, as shown in FIG. 9, a data transceiver module 910 includes: a communication data processing unit 911, connected to a data processing module 921 and a data processing module 922, and configured to receive and forward to-be-received data from a data sender and to-be-sent data from a host 900, first processing result data generated by the data processing module 921 and second processing result data generated by the data processing module 922; and a protocol stack 912, connected to the communication data processing unit 911, a host interface 901, and a network interface 902, and configured to establish respective communicative connections between the communication data processing unit 911 and the host 900 and the data sender/the data receiver by using the host interface 901 or the network interface 902, and perform data forwarding between the communication data processing unit 911, the host interface 901 and the network interface 902 after the respective communicative connections are established.

Further, in an implementation of the present specification, the protocol stack of the data transceiver module is a TCP/IP protocol stack.

Specifically, in an implementation of the present specification, in an application scenario, during data receiving, the protocol stack 912 first establishes respective communicative connections between the communication data processing unit 911 and the host 900 and the data sender by using the host interface 901 or the network interface 902. The data sender sends the to-be-received data to the protocol stack 912 by using the network interface 902. The protocol stack 912 sends the to-be-received data to the communication data processing unit 911. The communication data processing unit 911 sends the to-be-received data to the data processing module 921. After decompressing and/or decrypting the to-be-received data, the data processing module 921 returns the generated first processing result data to the communication data processing unit 911. The communication data processing unit 911 sends the first processing result data to the protocol stack 912. The protocol stack 912 sends the processing result data to the host 900 by using the host interface 901.

During data sending, the protocol stack 912 first establishes respective communicative connections between the communication data processing unit 911 and the host 900 and the data receiver by using the host interface 901 or the network interface 900. The host 900 sends the to-be-sent data to the protocol stack 912 by using the host interface 901. The protocol stack 912 sends the to-be-sent data to the communication data processing unit 911. The communication data processing unit 911 sends the to-be-sent data to the data processing module 922. After compressing and/or encrypting the to-be-sent data, the data processing module 922 returns the generated second processing result data to the communication data processing unit 911. The communication data processing unit 911 sends the second processing result data to the protocol stack 912. The protocol stack 912 sends the second processing result data to the data receiver by using the network interface 902.

Figure 10:
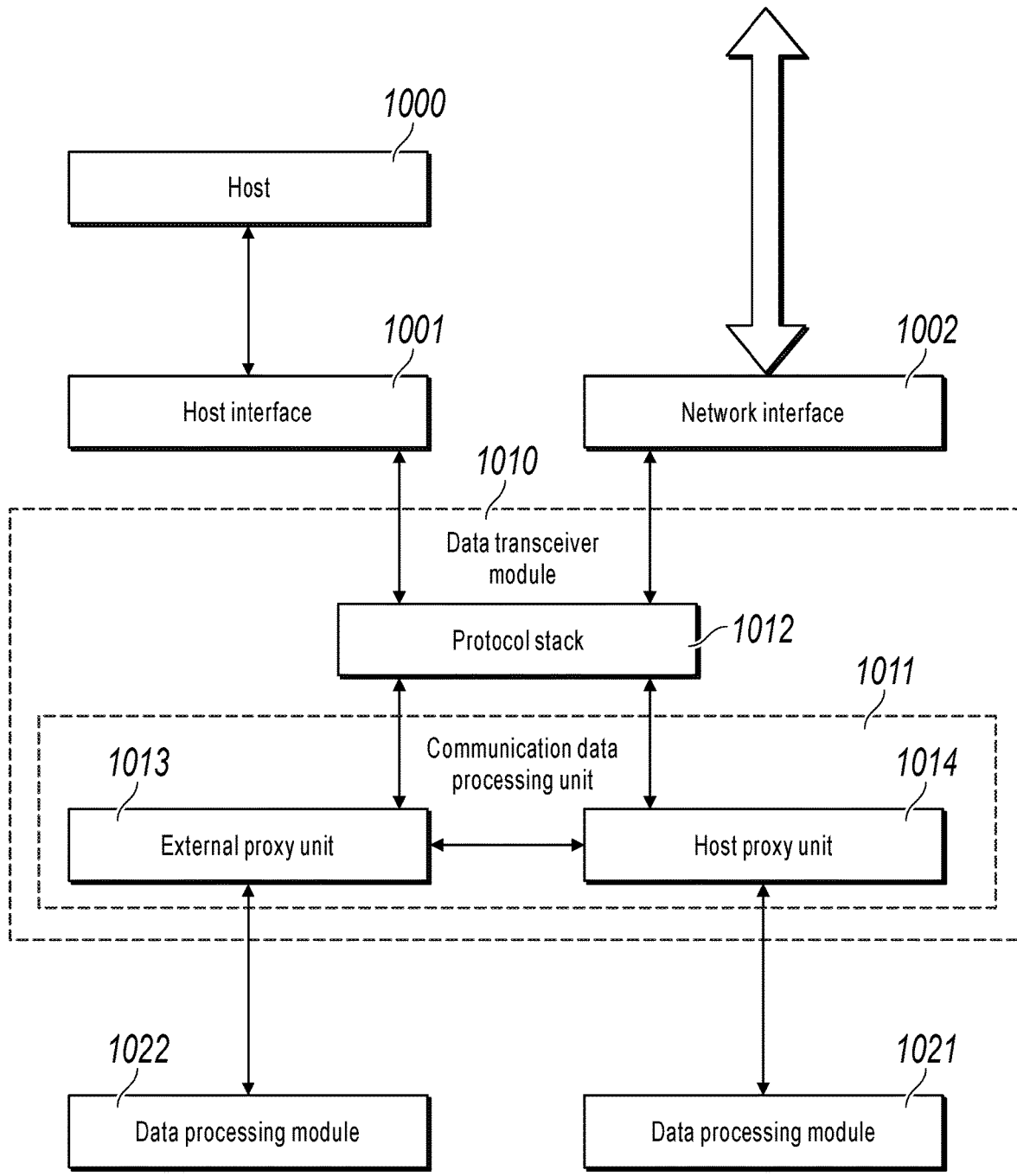

Further, in an implementation of the present specification, as shown in FIG. 10, a communication data processing unit 1011 includes an external proxy unit 1013 and a host proxy unit 1014.

The host proxy unit 1014 is configured to receive to-be-received data from a network interface 1002 by using a protocol stack 1012, send the to-be-received data from the network interface 1002 to a data processing module 1021, receive first processing result data from the data processing module 1021, and output the first processing result data.

The external proxy unit 1013 is configured to receive the first processing result data from the host proxy unit 1014, and send the first processing result data to a host interface 1001 by using the protocol stack 1012.

The external proxy unit 1013 is further configured to receive to-be-sent data from the host interface 1001 by using the protocol stack 1012, send the to-be-sent data to a data processing module 1022, receive second processing result data from the data processing module 1022, and output the second processing result data.

The host proxy unit 1014 is further configured to receive the second processing result data from the external proxy unit 1013, and send the second processing result data to the network interface 1002 by using the protocol stack 1012.

Specifically, in an implementation of the present specification, in an application scenario, during data receiving, the protocol stack 1012 first establishes respective communicative connections between the external proxy unit 1013 and a host 1000 and respective communicative connections between the host proxy unit 1014 and the data sender by using the host interface 1001 or the network interface 1002. The data sender sends the to-be-received data to the protocol stack 1012 by using the network interface 1002. The protocol stack 1012 sends the to-be-received data to the host proxy unit 1014. The host proxy unit 1014 sends the to-be-received data to the data processing module 1021. After decompressing and/or decrypting the to-be-received data, the data processing module 1021 returns the generated first processing result data to the host proxy unit 1014. The host proxy unit 1014 sends the first processing result data to the external proxy unit 1013. The external proxy unit 1013 sends the first processing result data to the protocol stack 1012. The protocol stack 1012 sends the first processing result data to the host 1000 by using the host interface 1001.

During data sending, the protocol stack 1012 first establishes respective communicative connections between the external proxy unit 1013 and the host 1000 and respective communicative connections between the host proxy unit 1014 and the data receiver by using the host interface 1001 or the network interface 1002. The host 1000 sends the to-be-sent data to the protocol stack 1012 by using the host interface 1001. The protocol stack 1012 sends the to-be-sent data to the external proxy unit 1013. The external proxy unit 1013 sends the to-be-sent data to the data processing module 1022. After compressing and/or encrypting the to-be-sent data, the data processing module 1022 returns the generated second processing result data to the external proxy unit 1013. The external proxy unit 1013 sends the second processing result data to the host proxy unit 1014. The host proxy unit 1014 sends the second processing result data to the protocol stack 1012. The protocol stack 1012 sends the second processing result data to the data receiver by using the network interface 1002.

Further, in an implementation of the present specification, an NIC is further provided. Specifically, the NIC includes: the host interface, the network interface, and the data transceiver module that are provided in the implementations of the present specification; a first data processing module, connected to the data transceiver module and configured to decompress and/or decrypt to-be-received data; and a second data processing module, connected to the data transceiver module and configured to compress and/or encrypt to-be-sent data.

Specifically, in an implementation of the present specification, the first data processing module configured to decompress and/or decrypt the to-be-received data and the second data processing module configured to compress and/or encrypt the to-be-sent data are the same calculation module. Further, in an implementation of the present specification, the first data processing module configured to decompress and/or decrypt the to-be-received data and the second data processing module configured to compress and/or encrypt the to-be-sent data are a hardware accelerator card.

Specifically, in an implementation of the present specification, a network interface card (a smart NIC) that has a flexible programmable capability is used to implement the NIC provided in the implementations of the present specification, and a processing module based on the network interface card is used to construct the first data processing module configured to decompress and/or decrypt the to-be-received data and the second data processing module configured to compress and/or encrypt the to-be-sent data. As such, through internal data communication of the network interface card, data can be exchanged between the data transceiver module and the first data processing module configured to decompress and/or decrypt the to-be-received data and the second data processing module configured to compress and/or encrypt the to-be-sent data, thereby greatly improving data throughput efficiency of a data transceiving system.

Specifically, in an implementation of the present specification, a compression and/or encryption algorithm and a decompression and/or decryption algorithm are determined based on a compression and/or encryption requirement and a decompression and/or decryption requirement of data transceiving. Data transmission logic of the data transceiver module in the implementations of the present specification can be complied by invoking program code of the compression and/or encryption algorithm and the decompression and/or decryption algorithm. Compiled program code and the compression and/or encryption algorithm and decompression and/or decryption algorithm are written into a programmable chip of the smart NIC. As such, the smart NIC can run the written program code to receive the to-be-received data, decompress and/or decrypt the to-be-received data by invoking the written decompression and/or decryption algorithm, to generate processing result data for the to-be-received data, output the processing result data for the to-be-received data, receive the to-be-sent data, compress and/or encrypt the to-be-sent data by invoking the written compression and/or encryption algorithm, to generate processing result data for the to-be-sent data, and output the processing result data for the to-be-sent data.

Figure 11:
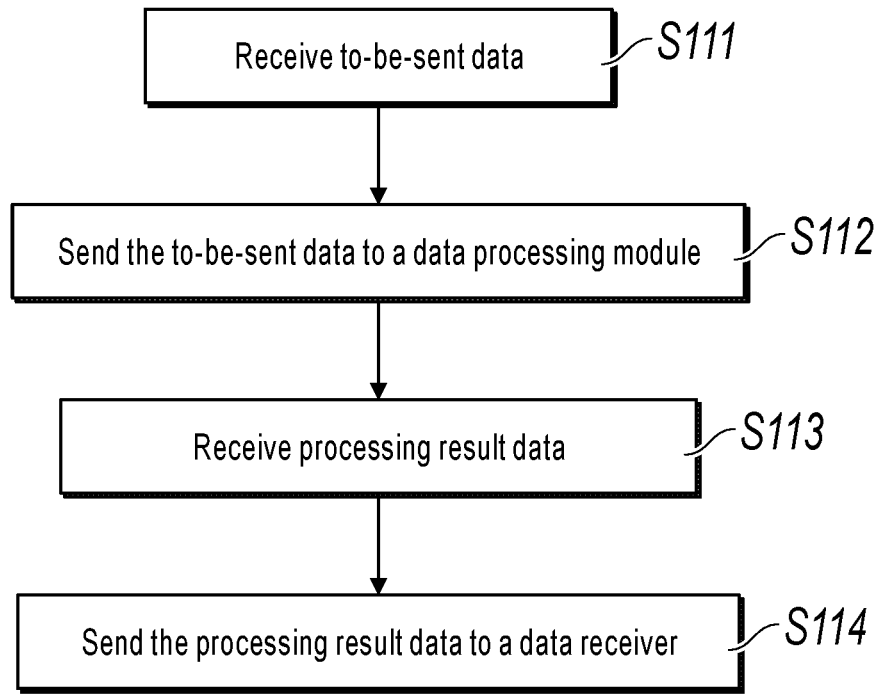
FIG. 11 and FIG. 12 are flowcharts illustrating application program running methods, according to implementations of the present specification.

Further, in an implementation of the present specification, a data sending method is further provided. Specifically, as shown in FIG. 11, in an implementation of the present specification, a procedure of the data sending method includes the following steps:

S111. Receive to-be-sent data from a host.

S112. Send the to-be-sent data to a data processing module.

S113. Receive processing result data from the data processing module, where the processing result data is generated by the data processing module by compressing and/or encrypting the to-be-sent data.

S114. Send the processing result data to a data receiver.

Figure 12:
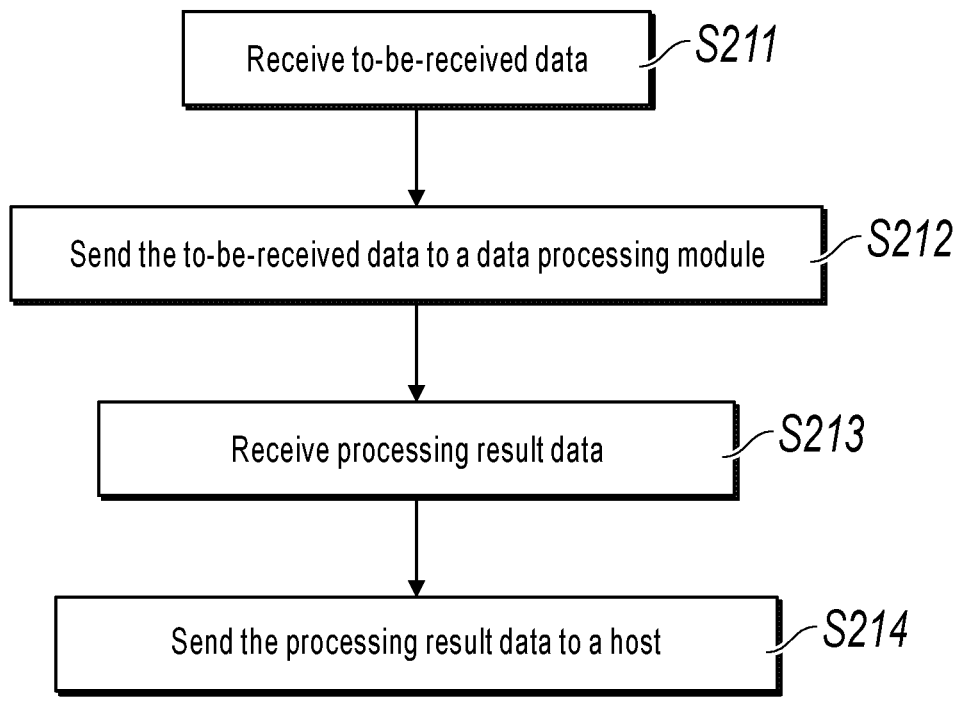

Further, in an implementation of the present specification, a data receiving method is further provided. Specifically, as shown in FIG. 12, in an implementation of the present specification, a procedure of the data receiving method includes the following steps:

S211. Receive to-be-received data from a data sender.

S212. Send the to-be-received data to a data processing module.

S213. Receive processing result data from the data processing module, where the processing result data is generated by the data processing module by decompressing and/or decrypting the to-be-received data.

S214. Send the processing result data to a host.

Further, based on the method in the present disclosure, the present disclosure further provides a device for processing information at user equipment, where the device includes a memory configured to store computer program instructions and a processor configured to execute the program instructions, and when the computer program instructions are executed by the processor, the device is triggered to execute the method in the present disclosure.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented system, comprising:
a host, comprising a central processing unit (CPU); and
a network interface controller (NIC), comprising:
   a host interface, the host interface being configured to connect to the host and receive to-be-sent data from the host;
   a data sending module, connected to the host interface of the NIC, and connected to a first data processing module that is outside the NIC, the data sending module being configured to send the to-be-sent data to the first data processing module, and receive first processing result data from the first data processing module, wherein the first processing result data is generated by the first data processing module by compressing and/or encrypting the to-be-sent data, and wherein the data sending module includes:
      a communication data processing unit, connected to the first data processing module, the communication data processing unit being configured to receive and forward the to-be-sent data and the first processing result data, wherein the communication data processing unit comprises (i) an external proxy unit, the external proxy unit being configured to receive the to-be-sent data from the host interface by using a protocol stack, send the to-be-sent data to the first data processing module, receive the first processing result data from the first data processing module, and output the first processing result data, and (ii) a host proxy unit, the host proxy unit being configured to receive the first processing result data from the external proxy unit, and send the first processing result data to a network interface by using the protocol stack; and
      the protocol stack, connected to the communication data processing unit, the host interface, and the network interface, the protocol stack being configured (i) to establish communicative connections between the external proxy unit and the host by using the host interface, and communicative connections between the host proxy unit and a data receiver by using the network interface, and (ii) to perform data forwarding after communicative connections are established, including receiving the to-be-sent data by the protocol stack from the host interface and forwarding the to-be-sent data to the external proxy unit, and receiving the first processing result data by the protocol stack from the host proxy unit and forwarding the first processing result data to the network interface; and
   the network interface, wherein the network interface is configured to connect to the data receiver, and send the first processing result data to the data receiver.

2. A computer-implemented system, comprising:
a host, comprising a central processing unit (CPU); and
a network interface controller (NIC), comprising:
   a network interface, the network interface being configured to connect to a data sender and receive to-be-received data from the data sender;

a data receiving module, connected to a second data processing module that is outside the NIC, the data receiving module being configured to send the to-be-received data to the second data processing module, and receive second processing result data from the second data processing module, wherein the second processing result data is generated by the second data processing module by decompressing and/or decrypting the to-be-received data, and wherein the data receiving module includes:
  a communication data processing unit, connected to the second data processing module, the communication data processing unit being configured to receive and forward the to-be-received data and the second processing result data, wherein the communication data processing unit comprises (i) a host proxy unit, the host proxy unit being configured to receive the to-be-received data from the network interface by using a protocol stack, send the to-be-received data to the second data processing module, receive the second processing result data from the second data processing module, and output the second processing result data, and (ii) an external proxy unit, the external proxy unit being configured to receive the second processing result data from the host proxy unit, and send the second processing result data to a host interface by using the protocol stack; and
  the protocol stack, connected to the communication data processing unit, the host interface, and the network interface, the protocol stack being configured (i) to establish communicative connections between the external proxy unit and the host by using the host interface, and communicative connections between the host proxy unit and the data sender by using the network interface, and (ii) to perform data forwarding after communicative connections are established, including receiving the to-be-received data by the protocol stack from the network interface and forwarding the to-be-received data to the host proxy unit, and receiving the second processing result data by the protocol stack from the external proxy unit and forwarding the second processing result data to the host interface; and
  the host interface, wherein the host interface is configured to connect to the host and send the second processing result data to the host.

3. A computer-implemented method, comprising:
receiving, by a network interface controller (NIC), to-be-sent data from a host, the host comprising a central processing unit (CPU);
sending, by the NIC and by using a data sending module of the NIC, the to-be-sent data to a first data processing module that is outside of the NIC, wherein the data sending module includes:
  a first communication data processing unit, connected to the first data processing module, the first communication data processing unit being configured to receive and forward the to-be-sent data and first processing result data, wherein the first communication data processing unit comprises (i) a first external proxy unit, the first external proxy unit being configured to receive the to-be-sent data from a host interface by using a first protocol stack, send the to-be-sent data to the first data processing module, receive the first processing result data from the first data processing module, and output the first processing result data, and (ii) a first host proxy unit, the first host proxy unit being configured to receive the first processing result data from the first external proxy unit, and send the first processing result data to a network interface by using the first protocol stack; and
  the first protocol stack, connected to the first communication data processing unit, the host interface, and the network interface, the first protocol stack being configured (i) to establish communicative connections between the first external proxy unit and the host by using the host interface, and communicative connections between the first host proxy unit and a data receiver by using the network interface, and (ii) to perform data forwarding after communicative connections are established, including receiving the to-be-sent data by the first protocol stack from the host interface and forwarding the to-be-sent data to the first external proxy unit, and receiving the first processing result data by the first protocol stack from the first host proxy unit and forwarding the first processing result data to the network interface;
receiving, by the NIC, the first processing result data from the first data processing module, wherein the first processing result data is generated by the first data processing module by compressing and/or encrypting the to-be-sent data;
sending, by the NIC and by using the network interface of the NIC, the first processing result data to the data receiver;
receiving, by the NIC and by using a data receiving module of the NIC, to-be-received data from a data sender, wherein the data receiving module includes:
  a second communication data processing unit, connected to a second data processing module that is outside of the NIC, the second communication data processing unit being configured to receive and forward the to-be-received data and second processing result data, wherein the second communication data processing unit comprises (i) a second host proxy unit, the second host proxy unit being configured to receive the to-be-received data from the network interface by using a second protocol stack, send the to-be-received data to the second data processing module, receive the second processing result data from the second data processing module, and output the second processing result data, and (ii) a second external proxy unit, the second external proxy unit being configured to receive the second processing result data from the second host proxy unit, and send the second processing result data to the host interface by using the second protocol stack; and
  the second protocol stack, connected to the second communication data processing unit, the host interface, and the network interface, the second protocol stack being configured (i) to establish communicative connections between the second external proxy unit and the host by using the host interface, and communicative connections between the second host proxy unit and the data sender by using the network interface, and (ii) to perform data forwarding after communicative connections are established, including receiving the to-be-received data by the second protocol stack from the network interface and forwarding the to-be-received data to the second host proxy unit, and receiving the second processing result data by the second protocol stack from the second external proxy unit and forwarding the second processing result data to the host interface;

sending, by the NIC, the to-be-received data to the second data processing module that is outside of the NIC;

receiving, by the NIC, the second processing result data from the second data processing module, wherein the second processing result data is generated by the second data processing module by decompressing and/or decrypting the to-be-received data; and sending, by the NIC and by using the host interface of the NIC, the second processing result data to the host.

4. The computer-implemented system of claim 1, wherein the first processing result data is generated by the first data processing module by compressing and/or encrypting the to-be-sent data using a corresponding compression and/or encryption algorithm that has been written into a programmable chip of the first data processing module.

5. The computer-implemented system of claim 2, wherein the second processing result data is generated by the second data processing module by decompressing and/or decrypting the to-be-received data using a corresponding decompression and/or decryption algorithm that has been written into a programmable chip of the second data processing module.

* * * * *

UNITED STATES PATENT AND TRADEMARK OFFICE
CERTIFICATE OF CORRECTION

Page 1 of 1

PATENT NO. : 11,082,410 B2
APPLICATION NO. : 16/818887
DATED : August 3, 2021
INVENTOR(S) : Lin Cao It is certified that error appears in the above-identified patent and that said Letters Patent is hereby corrected as shown below:

On the Title Page

Item [56], Column 2, Line 2, delete "Technica" and insert -- Technical --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*